US012728876B2

(12) United States Patent
Sakagawa et al.

(10) Patent No.: US 12,728,876 B2
(45) Date of Patent: Sep. 8, 2026

(54) ASSISTANCE CONTROLLING APPARATUS, ASSISTANCE CONTROLLING METHOD, AND COMPUTER READABLE STORAGE MEDIUM

(71) Applicant: HONDA MOTOR CO., LTD., Tokyo (JP)

(72) Inventors: Yuta Sakagawa, Saitama (JP); Takahiro Kurehashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 110 days.

(21) Appl. No.: 18/783,455

(22) Filed: Jul. 25, 2024

(65) Prior Publication Data

US 2025/0042427 A1 Feb. 6, 2025

(30) Foreign Application Priority Data

Jul. 31, 2023 (JP) ................................ 2023-124490

(51) Int. Cl.
*B60W 50/14* (2020.01)
*G08G 1/005* (2006.01)
*H04W 4/02* (2018.01)

(52) U.S. Cl.
CPC ............ *B60W 50/14* (2013.01); *G08G 1/005* (2013.01); *H04W 4/02* (2013.01); *B60W 2552/05* (2020.02)

(58) Field of Classification Search
CPC .. B60W 50/14; B60W 2552/05; G08G 1/005; H04W 4/02
See application file for complete search history.

(56) References Cited

U.S. PATENT DOCUMENTS

2015/0084791 A1* 3/2015 Jang ........................ G08G 1/07 340/944
2017/0092126 A1* 3/2017 Oshida .................. G08G 1/005
2018/0118106 A1* 5/2018 You ........................ G08G 1/005
2019/0031198 A1* 1/2019 Aoki ...................... G06V 10/25
2021/0039151 A1 2/2021 Yamauchi
2021/0312795 A1* 10/2021 Schonfeld .............. G08G 1/012
2023/0227033 A1* 7/2023 Sugawara ....... B60W 30/18159 701/301
2024/0051504 A1* 2/2024 Jeong ........................ B60T 7/22

FOREIGN PATENT DOCUMENTS

JP 2019028916 A 2/2019
JP 2019188429 A 10/2019

* cited by examiner

*Primary Examiner* — Mohamed Barakat

(57) ABSTRACT

An assistance controlling apparatus includes: an obtaining unit which obtains locational information of a user terminal; a determining unit which determines whether a user associated with the user terminal tends to cross a road at a place where no pedestrian crosswalk is provided; a storage controlling unit which causes identification information of the user to be stored as crossing user information indicating a user crossing a road at a place where no pedestrian crosswalk is provided, when it is determined by the determining unit that the user tends to cross a road at a place where no pedestrian crosswalk is provided; and an assistance controlling unit which performs control regarding assistance for a traffic participant on a condition that the identification information of the user is stored as the crossing user information, when the user terminal is at a place where no pedestrian crosswalk is provided.

18 Claims, 8 Drawing Sheets

| ID | TYPE OF CROSSING | ROAD INFORMATION | TIME OF DAY | TIME |
|---|---|---|---|---|
| ID1 | NON-USE OF PEDESTRIAN CROSSWALK | ARTERIAL ROAD | TIME OF DAY 1 | TIME 1 |
| ID2 | CROSSING BY JUMPING OUT | WIDTH 12 m | TIME OF DAY 2 | TIME 2 |
| . . . | . . . | . . . | . . . | . . . |

*FIG.4*

ASSISTANCE CONTROLLING APPARATUS, ASSISTANCE CONTROLLING METHOD, AND COMPUTER READABLE STORAGE MEDIUM

The contents of the following patent application(s) are incorporated herein by reference: NO. 2023-124490 filed in JP on Jul. 31, 2023.

BACKGROUND

1. Technical Field

The present invention relates to an assistance controlling apparatus, an assistance controlling method, and a computer readable storage medium.

2. Related Art

In recent years, efforts have been intensified to provide access to a sustainable transportation system with consideration given to even vulnerable people among other traffic participants. To this end, research and development has been focused on to even further improve traffic safety or convenience through research and development regarding a preventive safety technology. Patent Documents 1 and 2 describe a technology to give a caution or an alert regarding a pedestrian entering a road or a pedestrian walking hazardously.

PRIOR ART DOCUMENT

Patent Document

Patent Document 1: Japanese Patent Application Publication No. 2019-28916

Patent Document 2: Japanese Patent Application Publication No. 2019-188429

BRIEF DESCRIPTION OF THE DRAWINGS

FIG. 4 shows one example of a data structure of crossing user information of a user terminal 82.

DESCRIPTION OF EXEMPLARY EMBODIMENTS

Hereinafter, embodiments of the present invention will be described. However, the following embodiments are not for limiting the invention according to the claims. In addition, not all of the combinations of features described in the embodiments are essential to the solving means of the invention.

Figure 1:
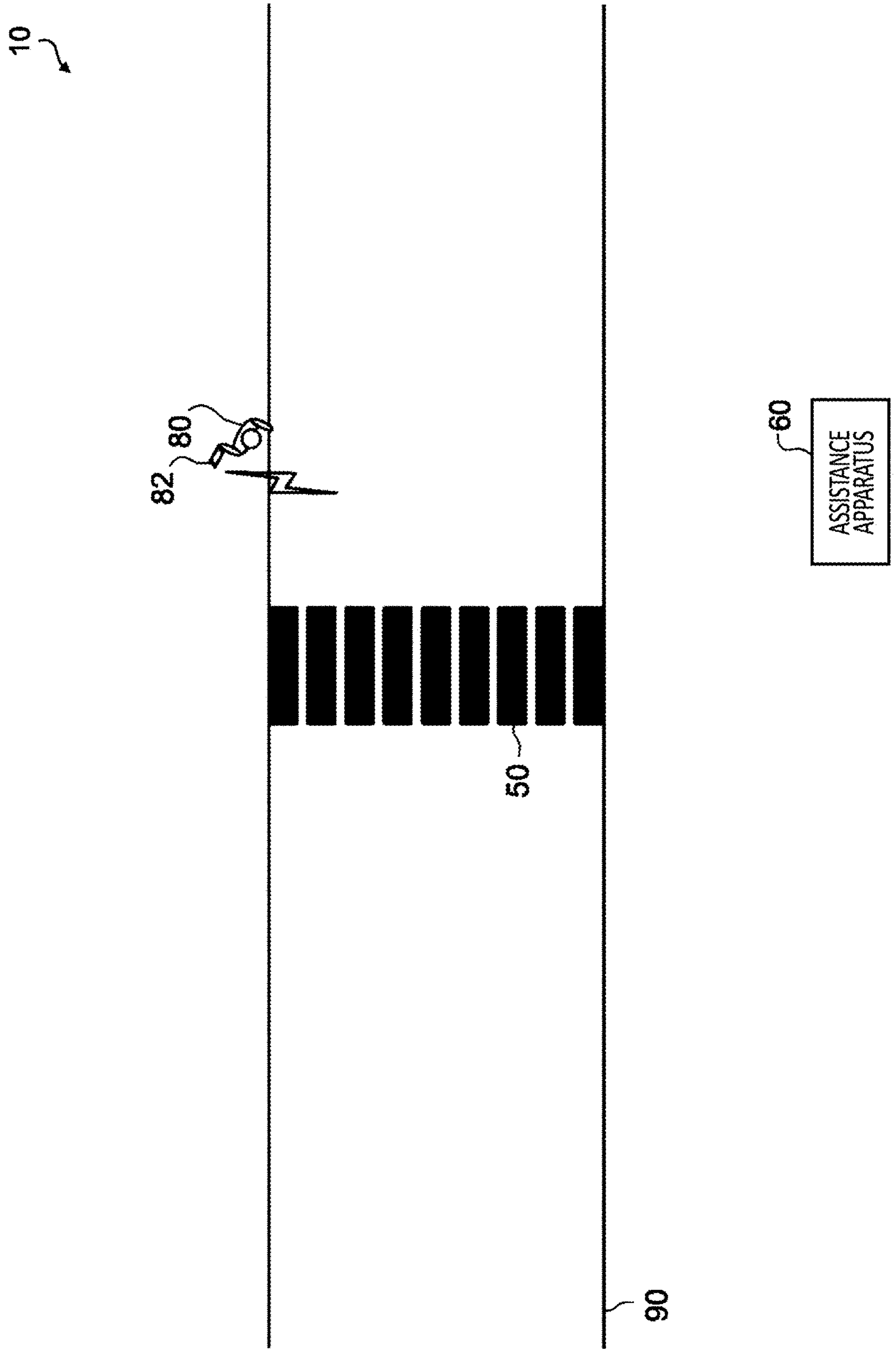
FIG. 1 schematically shows a usage scene of an assistance system 10.

FIG. 1 schematically shows a usage scene of an assistance system 10. The assistance system 10 includes a user terminal 82 and an assistance apparatus 60.

In the present embodiment, a user 80 is a pedestrian. The user terminal 82 is a terminal carried by the user 80. The user terminal 82 is, for example, a mobile terminal such as a smartphone. The user terminal 82 periodically transmits, to the assistance apparatus 60, current locational information of the user terminal 82 detected by a location sensor including a GNSS receiver.

The assistance apparatus 60 receives information transmitted from the user terminal 82, through mobile communication. The assistance apparatus 60 may receive the information transmitted from the user terminal 82, through the mobile communication as well as communication lines such as Internet and a dedicated line.

In the present embodiment, it may be assumed that the user 80 is within a predetermined range from a location of the user terminal 82. The location of the user terminal 82 may be considered as a location of the user 80.

When determining, based on locational information transmitted from the user terminal 82, that the user 80 has crossed a road 90, the assistance apparatus 60 identifies, based on a history of the locational information, what kind of tendency the user 80 has when crossing the road 90. For example, as shown in FIG. 1, the assistance apparatus 60 determines, based on the history of the locational information of the user terminal 82, whether the user 80 tends to cross the road at a place where a pedestrian crosswalk 50 is not provided instead of passing through the pedestrian crosswalk 50 even though the pedestrian crosswalk 50 is provided near the user 80. In addition, the assistance apparatus 60 determines whether the user 80 tends to cross the road even though a vehicle is approaching the user 80 at a place where no pedestrian crosswalk is provided near the user 80.

The assistance apparatus 60 stores road crossing tendency information indicating a road crossing tendency of the user 80 determined based on the locational information transmitted from the user terminal 82 in association with identification information of the user 80. For example, the assistance apparatus 60 stores the road crossing tendency information in association with identification information of the user terminal 82.

Figure 2:
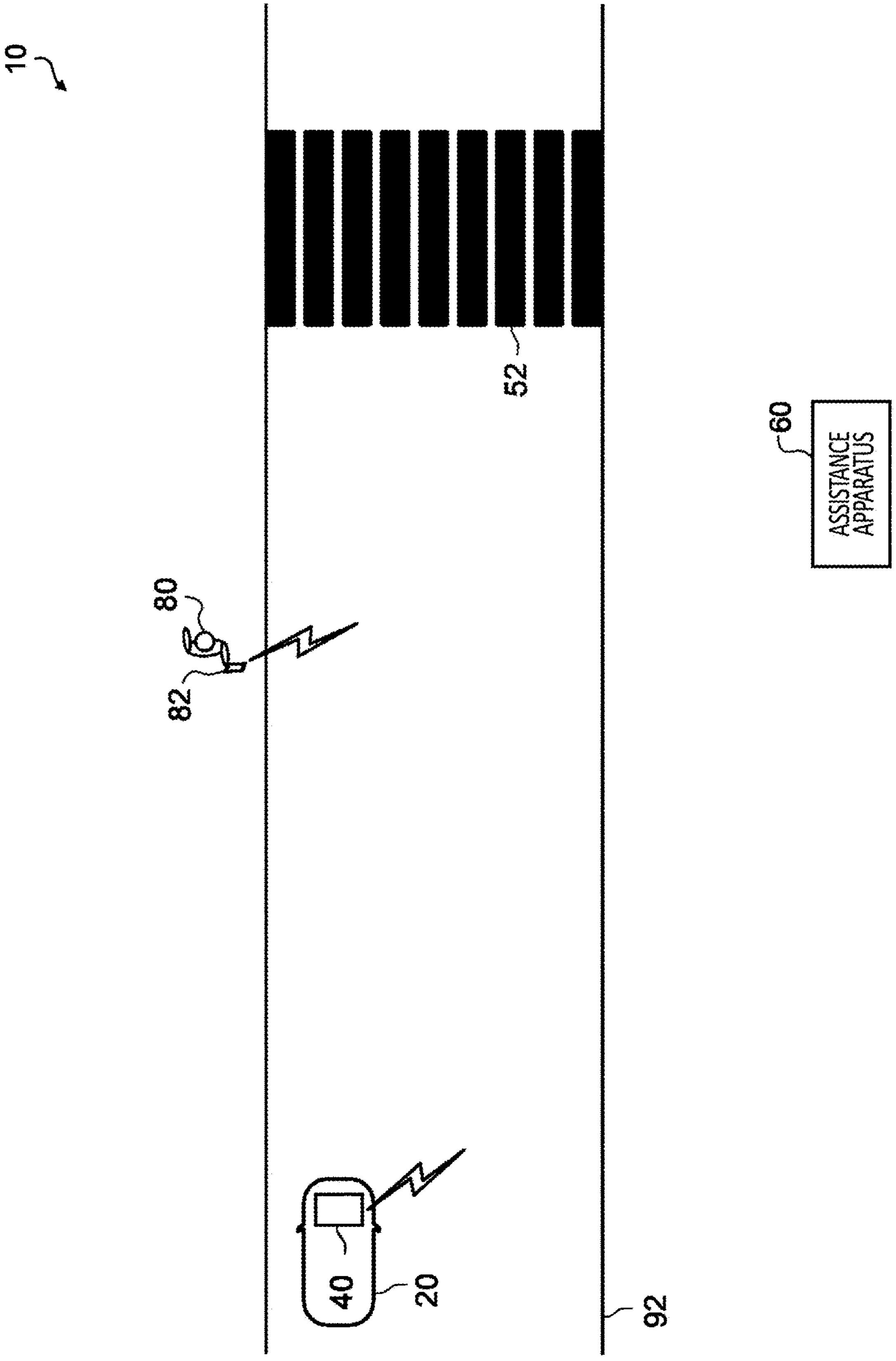
FIG. 2 is a diagram for describing a scene in which assistance for a traffic participant is provided by using road crossing tendency information.

FIG. 2 is a diagram for describing a scene in which assistance for a traffic participant is provided by using road crossing tendency information.

A vehicle 20 is a vehicle travelling on a road 92. The vehicle 20 is one example of a moving body. The vehicle 20 includes an in-vehicle processing apparatus 40. The in-vehicle processing apparatus 40 includes a function of communicating with an outside by using mobile communication. The in-vehicle processing apparatus 40 is configured to include sensors such as a location sensor including a global navigation satellite system (GNSS) receiver, a speed sensor such as a vehicle speed sensor, and a ranging sensor which measures a distance from the vehicle 20 to a surrounding object. The in-vehicle processing apparatus 40 includes a function of processing information obtained by various kinds of sensors included in the in-vehicle processing apparatus 40 and a function of communicating with an assistance apparatus 60. The in-vehicle processing apparatus 40 provides an advanced driver-assistance systems (ADAS) function included in the vehicle 20.

The assistance apparatus 60 receives information transmitted from the in-vehicle processing apparatus 40, through the mobile communication. The assistance apparatus 60 may receive the information transmitted from the in-vehicle processing apparatus 40, through the mobile communication as well as communication lines such as Internet and a dedicated line. The assistance apparatus 60 provides traffic assistance for a traffic participant based on information received from the in-vehicle processing apparatus 40 and a user terminal 82.

The assistance apparatus 60 determines that there is a pedestrian crosswalk 52 near the user terminal 82, based on locational information transmitted from the user terminal 82 and on map information including information indicating an installed location of a pedestrian crosswalk. The assistance apparatus 60 determines, based on the road crossing tendency information stored in association with identification information of a user 80, that the user 80 tends to cross the road at a place where no pedestrian crosswalk is provided even though there is a pedestrian crosswalk provided near the user 80.

When there is a location of the user terminal 82 within a predetermined range from a location of the vehicle 20 and the vehicle 20 is moving in a direction in which it is brought closer to the user 80, the assistance apparatus 60 further provides traffic assistance for the vehicle 20 and/or the user 80 based on the locational information of the user terminal 82 and on locational information of the vehicle 20 transmitted from the in-vehicle processing apparatus 40. For example, the assistance apparatus 60 transmits, to the in-vehicle processing apparatus 40, assistance information instructing the in-vehicle processing apparatus 40 to output warning information. The assistance information transmitted to the in-vehicle processing apparatus 40 may be information instructing to cause the warning information such as "Please be careful of pedestrians jumping out" to be outputted, with sound or through display by a display apparatus. The assistance apparatus 60 transmits, to the user terminal 82, assistance information instructing the user terminal 82 to output warning information. The assistance information transmitted to the user terminal 82 may be information instructing to cause the warning information such as "Please be careful, there is a vehicle approaching from behind" to be outputted, with sound.

According to an assistance system 10, it is possible to appropriately determine whether it is necessary to provide assistance, based on a tendency for a case where the user 80 crosses the road. As a result, when it is necessary to provide the assistance, the assistance information can be transmitted to the user terminal 82 and/or the vehicle 20. Accordingly, compared to a case of causing the warning information to be outputted whenever the user 80 is within the predetermined range from the vehicle 20, it is possible to refrain from transmission of useless warning information.

Figure 3:
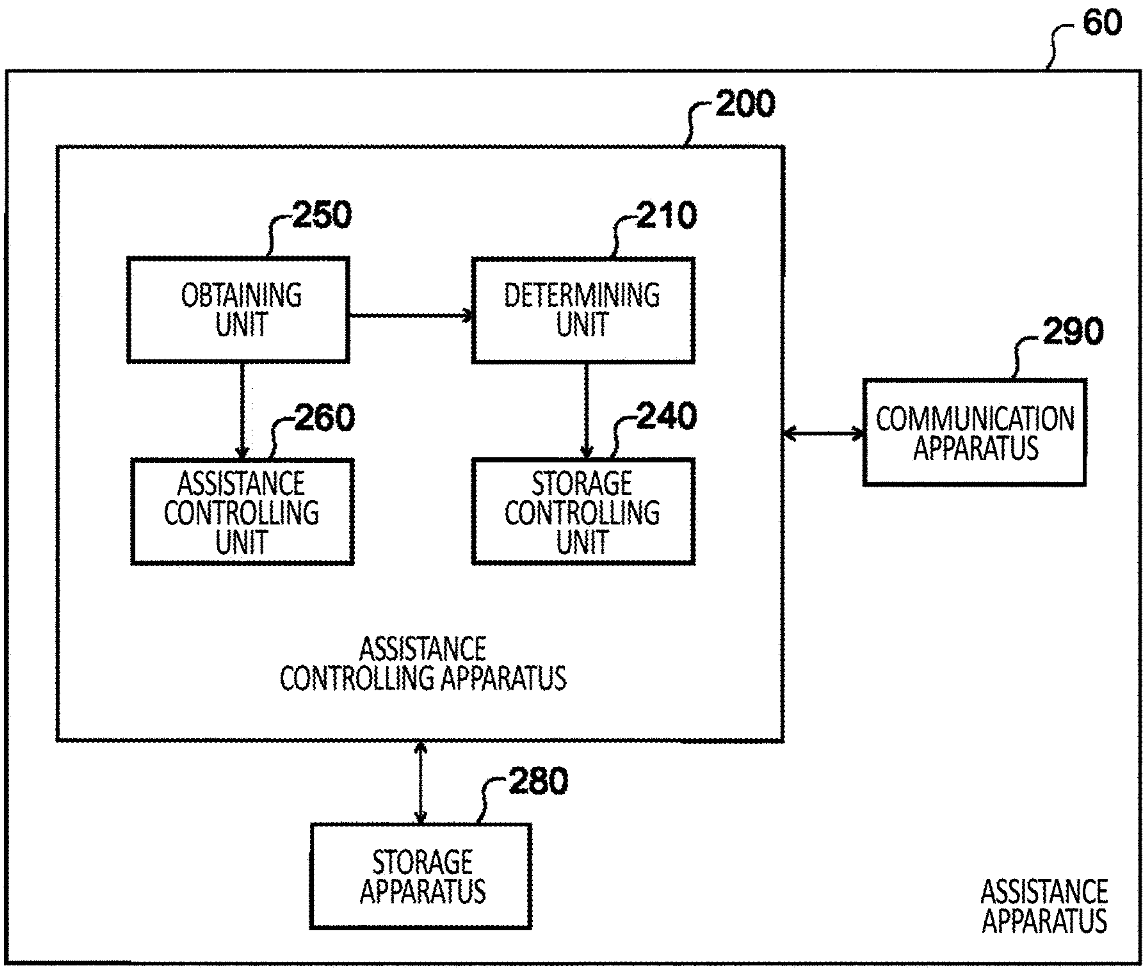
FIG. 3 shows a functional configuration of an assistance apparatus 60.

FIG. 3 shows a functional configuration of an assistance apparatus 60. The assistance apparatus 60 includes an assistance controlling apparatus 200, a communication apparatus 290, and a storage apparatus 280.

The communication apparatus 290 is responsible for communication between an assistance apparatus 60 and each of an in-vehicle processing apparatus 40 and a user terminal 82 based on control by the assistance controlling apparatus 200. The assistance controlling apparatus 200 is realized to include, for example, a circuit such as an arithmetic processing apparatus including a processor. The assistance controlling apparatus 200 may be realized by a microcomputer including a CPU, a ROM, a RAM, an I/O, bus, and the like. The storage apparatus 280 is realized to include a non-volatile storage medium. The assistance controlling apparatus 200 performs processing by using information stored in the storage apparatus 280. The storage apparatus 280 may store map information. The map information stored in the storage apparatus 280 may be used by the assistance controlling apparatus 200. The map information may include an installed location of a pedestrian crosswalk, a width of a road, or a type of a road.

The assistance controlling apparatus 200 includes an obtaining unit 250, a determining unit 210, a storage controlling unit 240, and an assistance controlling unit 260. It should be noted that a configuration may be adopted in which the assistance apparatus 60 does not have some functions in the functional configuration shown in FIG. 3.

The obtaining unit 250 obtains locational information of the user terminal 82. The determining unit 210 determines, based on a history of the locational information of the user terminal 82, whether a user 80 associated with the user terminal 82 tends to cross a road at a place where no pedestrian crosswalk is provided. When it is determined by the determining unit 210 that the user 80 tends to cross a road at a place where no pedestrian crosswalk is provided, the storage controlling unit 240 causes identification information of the user 80 to be stored as crossing user information indicating a user crossing a road at a place where no pedestrian crosswalk is provided. The assistance controlling unit 260 performs control regarding assistance for a traffic participant on a condition that the identification information of the user 80 is stored as the crossing user information, when the user terminal 82 is at a place where no pedestrian crosswalk is provided.

The determining unit 210 may determine, based on the history of the locational information of the user terminal 82 and on map information with an installed location of a pedestrian crosswalk stored therein, whether the user 80 associated with the user terminal 82 tends to cross a road at a location outside a pedestrian crosswalk within a predetermined range from a pedestrian crosswalk. The assistance controlling unit 260 may perform control regarding assistance for a traffic participant on a condition that the identification information of the user 80 is stored as the crossing user information, when the user terminal 82 is at a place where no pedestrian crosswalk is provided and the user terminal 82 is within a predetermined range from a pedestrian crosswalk.

The obtaining unit 250 may obtain locational information of a moving body moving on a road. The determining unit 210 may determine, based on the history of the locational information of the user terminal 82, a history of the locational information of the moving body, and on map information with an installed location of a pedestrian crosswalk stored therein, whether the user 80 associated with the user terminal 82 tends to cross a road even when the moving body is approaching the user 80 at a place where no pedestrian crosswalk is within a predetermined range. The assistance controlling unit 260 may perform control regarding assistance for a traffic participant on a condition that the identification information of the user 80 is stored as the crossing user information, when the user terminal 82 is at a place where no pedestrian crosswalk is provided, no pedestrian crosswalk is within a predetermined range from a location of the user terminal 82, and the moving body is approaching the user 80.

The assistance controlling unit 260 may perform control for causing a moving body being around the user terminal 82 to output a warning, as the assistance for the traffic participant. The assistance controlling unit 260 may perform control for causing the user terminal 82 to output a warning, as the assistance for the traffic participant.

When causing the identification information of the user 80 to be stored as the crossing user information, the storage controlling unit 240 may cause the identification information of the user 80 to be stored as the crossing user information in association with the width of the road. The assistance controlling unit 260 may perform control regarding assistance for a traffic participant on an additional condition that a width of a road near the user terminal 82 matches a width associated with the identification information of the user 80.

When causing the identification information of the user 80 to be stored as the crossing user information, the storage controlling unit 240 may cause the identification information of the user 80 to be stored as the crossing user information in association with the type of the road. Control regarding assistance for a traffic participant may be performed on an additional condition that a type of a road near the user terminal 82 matches a type associated with the identification information of the user 80.

The assistance controlling unit 260 may refrain from assistance for a traffic participant, when the identification information of the user 80 is not stored as the crossing user information, if the user terminal 82 is at a place where no pedestrian crosswalk is provided.

FIG. 4 shows one example of a data structure of crossing user information of a user terminal 82. The crossing user information is stored in a storage apparatus 280. The crossing user information includes, as data items, an ID, a type of crossing, road information, a time of day, and time. The crossing user information is one example of information indicating whether a user tends to cross a road at a place where no pedestrian crosswalk is provided.

The ID indicates identification information of the user terminal. The ID is one example of identification information of the user.

The type of crossing indicates a manner in which the user has crossed. For example, "NON-USE OF PEDESTRIAN CROSSWALK" in FIG. 4 indicates that the user crosses a road at a location outside a pedestrian crosswalk within a predetermined range from a pedestrian crosswalk. "NON-USE OF PEDESTRIAN CROSSWALK" indicates, for example, that the user crosses a road at a place where no pedestrian crosswalk is provided instead of passing through the pedestrian crosswalk even though there is a pedestrian crosswalk provided near the user. "CROSSING BY JUMPING OUT" indicates that the user crosses a road even when a vehicle is approaching the user at a place where no pedestrian crosswalk is within a predetermined range. "CROSSING BY JUMPING OUT" indicates, for example, that the user crosses a road even though a vehicle is approaching the user at a place where no pedestrian crosswalk is provided near the user. Crossing like "CROSSING BY JUMPING OUT" may occur such as in a case where the user mistakenly believes that he or she is walking on a road where pedestrians have priority, in addition to a case where the user does not care about a traffic rule.

The road information is information indicating an attribute of a road crossed by the user. The attribute of the road may be a type of the road, a width of the road, or the like. "ARTERIAL ROAD" in FIG. 4 indicates that the type of the road crossed by the user is an arterial road. "WIDTH 12 m" in FIG. 4 indicates that the width of the road crossed by the user is 12 m. The width of the road may be a total width of a footway and a roadway, or may be a width of only a roadway.

The time of day indicates a time of day when the user has crossed the road. The time indicates time when one combined data on the ID, the type of crossing, the road information, and the time of day was stored.

A storage controlling unit 240 may perform control for deleting data on the ID, the type of crossing, the road information, and the time of day, each time a predetermined time elapses. The user terminal 82 is not necessarily carried by a specific user 80 for a long period of time. Therefore, the storage controlling unit 240 may delete the combined data on the data ID, the type of crossing, the road information, and the time of day, according to time elapsed from the time when the data was stored which is included in the crossing user information. The storage controlling unit 240 may delete the combined data on the data ID, the type of crossing, the road information, and the time of day, when one year has elapsed from the time when the data was stored which is included in the crossing user information.

Figure 5:
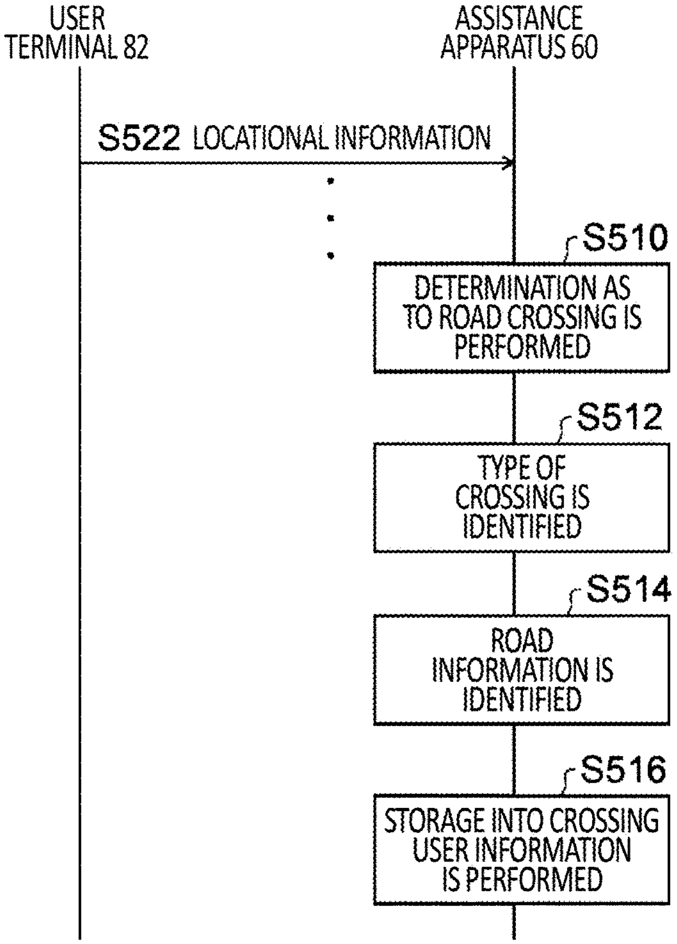
FIG. 5 shows one example of an execution sequence of processing regarding an assistance controlling method performed in a user terminal 82 and an assistance apparatus 60.

FIG. 5 shows one example of an execution sequence of processing regarding an assistance controlling method performed in a user terminal 82 and an assistance apparatus 60.

In S522, the user terminal 82 transmits, to the assistance apparatus 60, locational information indicating a current location of the user terminal 82 which is based on a signal received from a GNSS satellite together with identification information of the user terminal 82. The transmission of the locational information and the identification information from the user terminal 82 to the assistance apparatus 60 is periodically performed.

In S510, a determining unit 210 of the assistance apparatus 60 determines, based on a history of the locational information of the user terminal 82 and on map information, whether a user 80 has crossed a road 90. When determining that the user 80 has crossed the road 90, in S512, the determining unit 210 identifies a type of crossing at least based on the history of the locational information of the user terminal 82 and on information indicating an installed location of a pedestrian crosswalk which is included in the map information. Here, when there is a vehicle around the user 80, the determining unit 210 may determine, further based on locational information of the surrounding vehicle, whether the type of crossing is "CROSSING BY JUMPING OUT".

In S514, the determining unit 210 identifies, based on the locational information of the user terminal 82 and the map information, road information on the road crossed by the user 80. In S516, a storage controlling unit 240 causes a storage apparatus 280 to store, as crossing user information, the type of crossing identified in S512, the road information identified in S514, a current time of day, and a current time, in association with the identification information of the user terminal 82.

Figure 6:
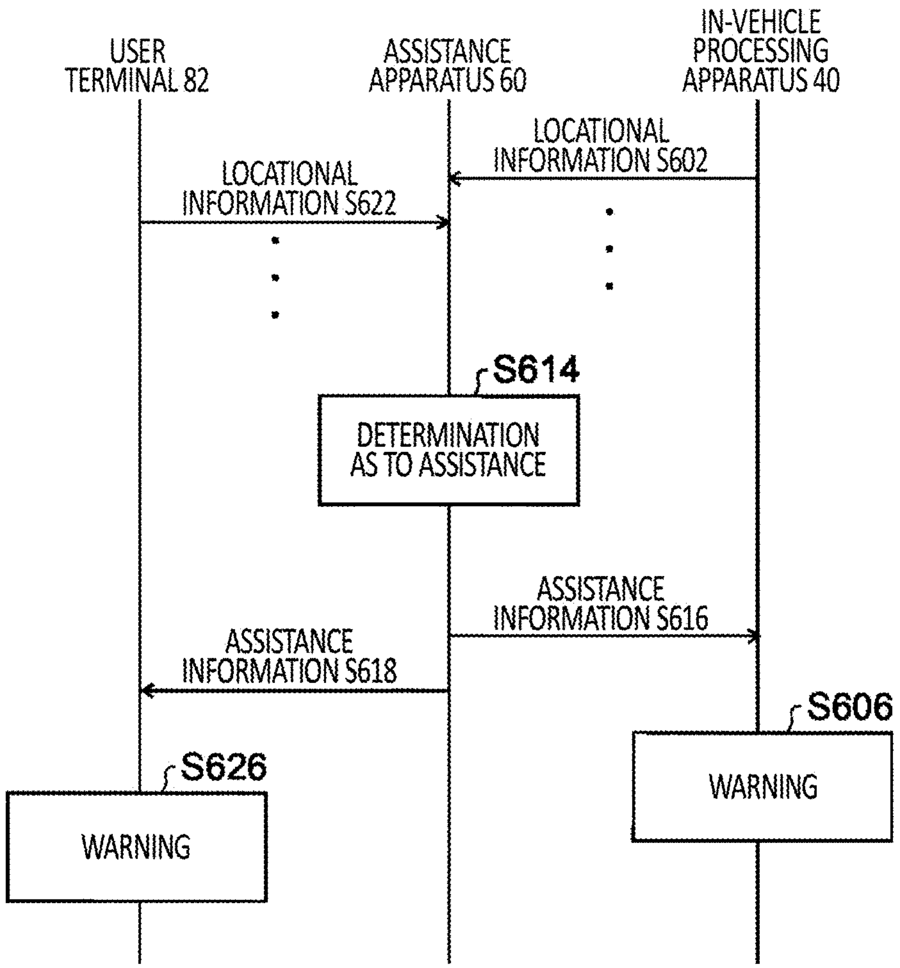
FIG. 6 shows one example of an execution sequence of processing performed in a user terminal 82, an assistance apparatus 60, and an in-vehicle processing apparatus 40 included in a vehicle 20.

FIG. 6 shows one example of an execution sequence of processing performed in a user terminal 82, an assistance apparatus 60, and an in-vehicle processing apparatus 40 included in a vehicle 20.

In S602, the in-vehicle processing apparatus 40 transmits, to the assistance apparatus 60, locational information of the vehicle 20 which is based on a signal received from a GNSS satellite. The transmission of the locational information from the in-vehicle processing apparatus 40 to the assistance apparatus 60 is periodically performed.

In S622, the user terminal 82 transmits, to the assistance apparatus 60, locational information indicating a current location of the user terminal 82 which is based on the signal received from the GNSS satellite together with identification information of the user terminal 82. The transmission of the locational information and the identification information from the user terminal 82 to the assistance apparatus 60 is periodically performed.

In S614, an assistance controlling unit 260 of the assistance apparatus 60 determines whether assistance for the vehicle 20 and/or the user terminal 82 as traffic participants is to be provided. For example, the assistance controlling unit 260 determines that the assistance for the vehicle 20 and/or the user terminal 82 is to be provided, when it is determined that there is a high possibility for a user 80 to cross a road 92 based on crossing user information, the identification information of the user terminal 82, road information of the road 92 included in map information, and on a time of day to which a current time belongs, and when a location of the user terminal 82 is included in a predetermined surrounding area which includes a location of the vehicle 20.

When the assistance controlling unit 260 determines in S614 that the assistance for the vehicle 20 and/or the user terminal 82 is to be provided, in S616, the assistance controlling unit 260 transmits, to the in-vehicle processing apparatus 40, assistance information instructing the in-vehicle processing apparatus 40 to output a warning, by controlling a communication apparatus 290. Further, in S618, the assistance controlling unit 260 transmits, to the user terminal 82, assistance information instructing the user terminal 82 to output the warning, by controlling the communication apparatus 290.

When receiving the assistance information from the assistance apparatus 60, in S606, the in-vehicle processing apparatus 40 informs an occupant of the vehicle 20 of a warning regarding entry of a pedestrian onto the road 92, with a human machine interface (HMI) function included in the in-vehicle processing apparatus 40, according to the assistance information. The in-vehicle processing apparatus 40 may inform the occupant of the vehicle 20 of the warning with sound and through display on a display apparatus included in the vehicle 20.

When receiving the assistance information from the assistance apparatus 60, in S626, the user terminal 82 informs the user 80 of a warning regarding approach of a vehicle or the entry onto the road 92, with the HMI function included in the user terminal 82. The user terminal 82 may inform the user 80 of the warning with sound.

Figure 7:
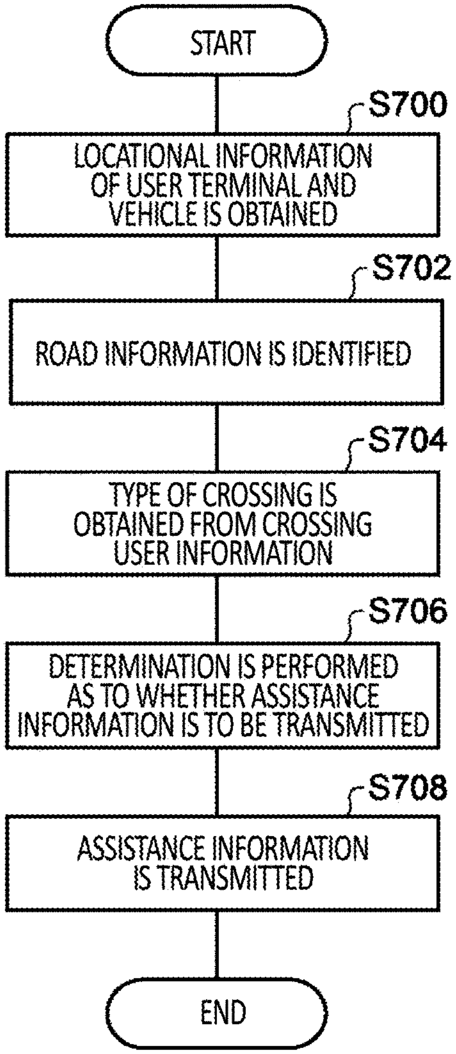
FIG. 7 shows one example of a flowchart regarding processing according to an assistance controlling method executed in an assistance controlling apparatus 200.

FIG. 7 shows one example of a flowchart regarding processing according to an assistance controlling method executed in an assistance controlling apparatus 200. FIG. 7 is a flowchart regarding, for example, processing of S614, S616, and S618 in FIG. 6.

In S700, an obtaining unit 250 obtains locational information of a user terminal 82 and locational information of a vehicle 20. In S702, an assistance controlling unit 260 identifies, based on map information and on the locational information of the user terminal 82, road information of a road 92 on which the user terminal 82 is walking.

In S704, the assistance controlling unit 260 obtains, from crossing user information stored in a storage apparatus 280, a type of crossing associated with identification information of the user terminal 82, the road information identified in S702, and with a current time of day. When the type of crossing is obtained, the assistance controlling unit 260 determines that there is a high possibility for a user 80 to cross the road 92.

When the assistance controlling unit 260 determines in S704 that there is a high possibility for the user 80 to cross the road 92, in S706, the assistance controlling unit 260 determines whether assistance information is to be transmitted. For example, when a location of the user terminal 82 is included in a predetermined surrounding area which includes a location of the vehicle 20, the assistance controlling unit 260 determines that the assistance information is to be transmitted.

In S708, the assistance controlling unit 260 transmits, to an in-vehicle processing apparatus 40 and/or the user terminal 82, the assistance information by controlling a communication apparatus 290, according to a result of the determination in S706. The assistance controlling unit 260 may cause the assistance information according to the type of crossing obtained in S704 to be transmitted. For example, when the type of crossing is "NON-USE OF PEDESTRIAN CROSSWALK", the assistance information transmitted to the user 80 may be information instructing the user terminal 82 to inform that there is a pedestrian crosswalk near the user 80. When the type of crossing is "NON-USE OF PEDESTRIAN CROSSWALK", the assistance information transmitted to the in-vehicle processing apparatus 40 may be information instructing the in-vehicle processing apparatus 40 to inform that there is a possibility for the user 80 to cross the road before the pedestrian crosswalk.

When the type of crossing is "CROSSING BY JUMPING OUT", the assistance information transmitted to the user 80 may be information instructing the user terminal 82 to inform that the road is not a pedestrian priority road. When the type of crossing is "CROSSING BY JUMPING OUT", the assistance information transmitted to the in-vehicle processing apparatus 40 may be information instructing the in-vehicle processing apparatus 40 to inform that the user may often falsely recognize the road as a pedestrian priority road.

According to an assistance system 10 described above, it is possible to appropriately determine, based on a tendency for a case where the user 80 crosses a road, whether it is necessary to provide assistance, and to transmit the assistance information to the user terminal 82 and/or the vehicle 20. As a result, it is possible to refrain from transmission of useless warning information.

Figure 8:
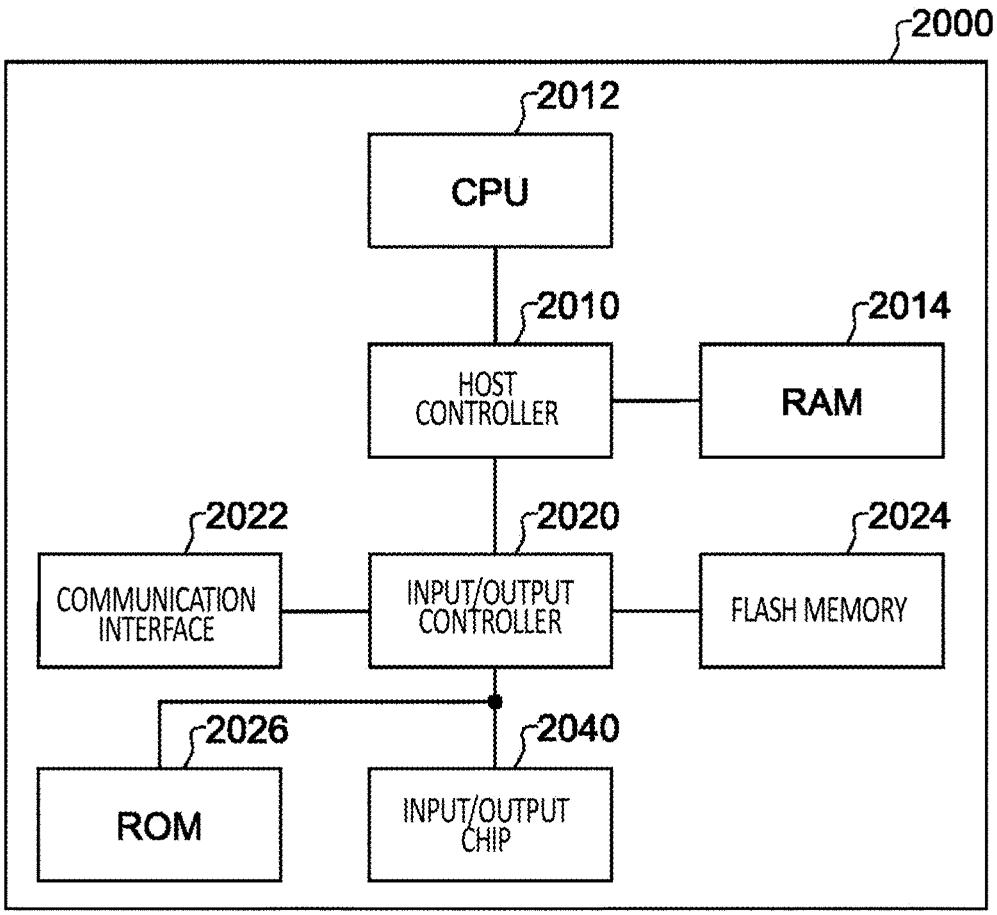
FIG. 8 shows an example of a computer 2000.

FIG. 8 shows an example of a computer 2000 in which a plurality of embodiments of the present invention may be entirely or partially embodied. A program installed in the computer 2000 can cause the computer 2000 to: function as an apparatus such as an assistance apparatus 60 according to the embodiments or each unit of the apparatus; execute operations associated with the apparatus or each unit of the apparatus; and/or execute a process according to the embodiments or steps of the process. Such a program may be executed by a CPU 2012 in order to cause the computer 2000 to execute a specific operation associated with some or all of the processing procedures and the blocks in the block diagrams described in the present specification.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to a program stored in the ROM 2026 and the RAM 2014, thereby controlling each unit.

The communication interface 2022 communicates with another electronic device via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

Programs are provided via a network or a computer readable storage medium such as a CD-ROM, a DVD-ROM, or a memory card. The RAM 2014, the ROM 2026, or the flash memory 2024 is an example of the computer readable storage medium. The programs are installed in the flash memory 2024, the RAM 2014, or the ROM 2026, and executed by the CPU 2012. Information processing written in these programs is read by the computer 2000, and provides cooperation between the programs and the various types of hardware resources described above. An apparatus or a method may be configured by realizing operations or processing of information depending on a use of the computer 2000.

For example, when a communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various kinds of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various kinds of processing including various kinds of operations, information processing, conditional judgement, conditional branching, unconditional branching, information search/replacement, or the like described in the present specification and designated by instruction sequences of the programs, and write back a result into the RAM 2014. In addition, the CPU 2012 may search for information in a file, a database, or the like in the recording medium. For example, when a plurality of entries each having an attribute value of a first attribute associated with an attribute value of a second attribute, is stored in the recording medium, the CPU 2012 may search for an entry having a designated attribute value of the first attribute that matches a condition from these plurality of entries, and read the attribute value of the second attribute stored in this entry, thereby obtaining the attribute value of the second attribute associated with the first attribute that satisfies a predetermined condition.

The programs or software module described above may be stored on the computer 2000 or in a computer readable storage medium near the computer 2000. A recording medium such as a hard disk or a RAM provided in a server system connected to a dedicated communication network or the Internet can be used as the computer readable storage medium. The programs stored in the computer readable storage medium may be provided to the computer 2000 via a network.

The programs installed onto the computer 2000 and causing the computer 2000 to function as the assistance apparatus 60 may instruct the CPU 2012 or the like to cause the computer 2000 to function as each unit of the assistance apparatus 60 (for example, the assistance controlling apparatus 200 or the like). The information processing written in these programs are read by the computer 2000 to cause the computer to function as each unit of the assistance apparatus 60, which is specific means realized by the cooperation of software and the various kinds of hardware resources described above. These specific means realize arithmetic operations or processing of information according to the intended use of the computer 2000 in the present embodiment, and the assistance apparatus 60 is thereby constructed to be specific for the intended use.

Various embodiments have been described with reference to the block diagrams and the like. In the block diagrams, each block may represent (1) a step of a process in which an operation is executed, or (2) each unit of the apparatus responsible for executing the operation. A specific step and each unit may be implemented by a dedicated circuit, a programmable circuit supplied with computer readable instructions stored on a computer readable storage medium, and/or a processor supplied with computer readable instructions stored on a computer readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and another logical operation, and a memory element such as a flip-flop, a register, a field programmable gate array (FPGA), a programmable logic array (PLA), or the like.

The computer readable storage medium may include any tangible device capable of storing instructions to be executed by an appropriate device, so that the computer readable storage medium having instructions stored therein constitutes at least a part of a product including instructions which may be executed to provide means for executing processing procedures or operations designated in the block diagrams. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

Computer readable instructions may be provided to a processor of a general purpose computer, a special purpose computer, or another programmable data processing apparatus, or to programmable circuit, locally or via a local area network (LAN), wide area network (WAN) such as the Internet, and a computer readable instruction may be executed to provide means for executing operations designated in the described processing procedures or block diagrams. Examples of the processor include a computer processor, a processing unit, a microprocessor, a digital signal processor, a controller, a microcontroller, and the like.

While the present invention has been described by way of the embodiments, the technical scope of the present invention is not limited to the above-described embodiments. It is apparent to persons skilled in the art that various alterations or improvements can be made to the above-described embodiments. It is also apparent from description of the claims that the embodiments to which such alterations or improvements are made can be included in the technical scope of the present invention.

It should be noted that the operations, procedures, steps, steps, and the like of each process executed by an apparatus, system, program, and method shown in the claims, embodiments, or diagrams can be realized in any order as long as the order is not indicated by "prior to," "before," or the like and as long as the output from a previous process is not used in a later process. Even if the operation flow is described using phrases such as "first" or "next" for the sake of convenience in the claims, specification, or drawings, it does not necessarily mean that the process must be performed in this order.

EXPLANATION OF REFERENCES

10: assistance system
20: vehicle
40: in-vehicle processing apparatus
50, 52: pedestrian crosswalk
60: assistance apparatus
80: user
82: user terminal
90: road
92: road
200: assistance controlling apparatus
210: determining unit
240: storage controlling unit
250: obtaining unit
260: assistance controlling unit
280: storage apparatus
290: communication apparatus
2000: computer
2010: host controller
2012: CPU
2014: RAM
2020: input/output controller
2022: communication interface
2024: flash memory
2026: ROM
2040: input/output chip.

What is claimed is:

1. An assistance controlling apparatus comprising:
at least one processor;
an obtaining unit that uses the at least one processor to obtain locational information of a user terminal;
a determining unit that uses the at least one processor to determine, based on a history of the locational information of the user terminal, whether a user associated with the user terminal tends to cross a road at a place where no pedestrian crosswalk is provided;
a storage controlling unit that uses the at least one processor to cause identification information of the user to be stored as crossing user information indicating a user crossing a road at a place where no pedestrian crosswalk is provided, when it is determined by the determining unit that the user tends to cross a road at a place where no pedestrian crosswalk is provided; and
an assistance controlling unit that uses the at least one processor to perform control regarding assistance for a traffic participant on a condition that the identification information of the user is stored as the crossing user information, when the user terminal is at a place where no pedestrian crosswalk is provided, wherein
the assistance controlling unit refrains from assistance for a traffic participant, when the identification information of the user is not stored as the crossing user information, if the user terminal is at a place where no pedestrian crosswalk is provided.

2. The assistance controlling apparatus according to claim 1, wherein
the assistance controlling unit performs control for causing a moving body being around the user terminal to output a warning, as the assistance for the traffic participant.

3. The assistance controlling apparatus according to claim 1, wherein
the assistance controlling unit performs control for causing the user terminal to output a warning, as the assistance for the traffic participant.

4. An assistance controlling apparatus comprising:
at least one processor;
an obtaining unit that uses the at least one processor to obtain locational information of a user terminal;
a determining unit that uses the at least one processor to determine, based on a history of the locational information of the user terminal, whether a user associated with the user terminal tends to cross a road at a place where no pedestrian crosswalk is provided;
a storage controlling unit that uses the at least one processor to cause identification information of the user to be stored as crossing user information indicating a user crossing a road at a place where no pedestrian crosswalk is provided, when it is determined by the determining unit that the user tends to cross a road at a place where no pedestrian crosswalk is provided; and
an assistance controlling unit that uses the at least one processor to perform control regarding assistance for a traffic participant on a condition that the identification information of the user is stored as the crossing user information, when the user terminal is at a place where no pedestrian crosswalk is provided, wherein
the determining unit determines, based on the history of the locational information of the user terminal and on map information with an installed location of a pedestrian crosswalk stored therein, whether the user associated with the user terminal tends to cross a road at a location outside a pedestrian crosswalk within a predetermined range from a pedestrian crosswalk, and
the assistance controlling unit performs control regarding assistance for a traffic participant on a condition that the identification information of the user is stored as the crossing user information, when the user terminal is at a place where no pedestrian crosswalk is provided and the user terminal is within a predetermined range from a pedestrian crosswalk.

5. The assistance controlling apparatus according to claim 4, wherein the assistance controlling unit performs control for causing a moving body being around the user terminal to output a warning, as the assistance for the traffic participant.

6. The assistance controlling apparatus according to claim 4, wherein the assistance controlling unit performs control for causing the user terminal to output a warning, as the assistance for the traffic participant.

7. The assistance controlling apparatus according to claim 4, wherein when causing the identification information of the user to be stored as the crossing user information, the storage controlling unit causes the identification information of the user to be stored as the crossing user information in association with a width of a road, and the assistance controlling unit performs control regarding assistance for a traffic participant on an additional condition that a width of a road near the user terminal matches a width associated with the identification information of the user.

8. The assistance controlling apparatus according to claim 4, wherein when causing the identification information of the user to be stored as the crossing user information, the storage controlling unit causes the identification information of the user to be stored as the crossing user information in association with a type of a road, and control regarding assistance for a traffic participant is provided on an additional condition that a type of a road near the user terminal matches a type associated with the identification information of the user.

9. The assistance controlling apparatus according to claim 4, wherein the assistance controlling unit refrains from assistance for a traffic participant, when the identification information of the user is not stored as the crossing user information, if the user terminal is at a place where no pedestrian crosswalk is provided.

10. An assistance controlling apparatus comprising:

at least one processor;

an obtaining unit that uses the at least one processor to obtain locational information of a user terminal;

a determining unit that uses the at least one processor to determine, based on a history of the locational information of the user terminal, whether a user associated with the user terminal tends to cross a road at a place where no pedestrian crosswalk is provided;

a storage controlling unit that uses the at least one processor to cause identification information of the user to be stored as crossing user information indicating a user crossing a road at a place where no pedestrian crosswalk is provided, when it is determined by the determining unit that the user tends to cross a road at a place where no pedestrian crosswalk is provided; and an assistance controlling unit that uses the at least one processor to perform control regarding assistance for a traffic participant on a condition that the identification information of the user is stored as the crossing user information, when the user terminal is at a place where no pedestrian crosswalk is provided, wherein the obtaining unit obtains locational information of a moving body moving on a road, the determining unit determines, based on the history of the locational information of the user terminal, a history of the locational information of the moving body, and on map information with an installed location of a pedestrian crosswalk stored therein, whether the user associated with the user terminal tends to cross a road even when the moving body is approaching the user at a place where no pedestrian crosswalk is within a predetermined range, and the assistance controlling unit performs control regarding assistance for a traffic participant on a condition that the identification information of the user is stored as the crossing user information, when the user terminal is at a place where no pedestrian crosswalk is provided, no pedestrian crosswalk is within a predetermined range from a location of the user terminal, and the moving body is approaching the user.

11. The assistance controlling apparatus according to claim 10, wherein the assistance controlling unit performs control for causing a moving body being around the user terminal to output a warning, as the assistance for the traffic participant.

12. The assistance controlling apparatus according to claim 10, wherein the assistance controlling unit performs control for causing the user terminal to output a warning, as the assistance for the traffic participant.

13. The assistance controlling apparatus according to claim 10, wherein when causing the identification information of the user to be stored as the crossing user information, the storage controlling unit causes the identification information of the user to be stored as the crossing user information in association with a width of a road, and the assistance controlling unit performs control regarding assistance for a traffic participant on an additional condition that a width of a road near the user terminal matches a width associated with the identification information of the user.

14. The assistance controlling apparatus according to claim 10, wherein when causing the identification information of the user to be stored as the crossing user information, the storage controlling unit causes the identification information of the user to be stored as the crossing user information in association with a type of a road, and control regarding assistance for a traffic participant is provided on an additional condition that a type of a road near the user terminal matches a type associated with the identification information of the user.

15. The assistance controlling apparatus according to claim 10, wherein the assistance controlling unit refrains from assistance for a traffic participant, when the identification information of the user is not stored as the crossing user information, if the user terminal is at a place where no pedestrian crosswalk is provided.

16. An assistance controlling apparatus comprising:

at least one processor;

an obtaining unit that uses the at least one processor to obtain locational information of a user terminal;

a determining unit that uses the at least one processor to determine, based on a history of the locational information of the user terminal, whether a user associated with the user terminal tends to cross a road at a place where no pedestrian crosswalk is provided;

a storage controlling unit that uses the at least one processor to cause identification information of the user to be stored as crossing user information indicating a user crossing a road at a place where no pedestrian crosswalk is provided, when it is determined by the determining unit that the user tends to cross a road at a place where no pedestrian crosswalk is provided; and an assistance controlling unit that uses the at least one processor to perform control regarding assistance for a traffic participant on a condition that the identification information of the user is stored as the crossing user information, when the user terminal is at a place where no pedestrian crosswalk is provided, wherein when causing the identification information of the user to be stored as the crossing user information, the storage controlling unit causes the identification information of the user to be stored as the crossing user information in association with a width or a type of a road, and the assistance controlling unit performs control regarding assistance for a traffic participant on an additional condition that a width or a type of a road near the user terminal matches a width or a type associated with the identification information of the user.

17. An assistance controlling method comprising:

obtaining locational information of a user terminal;

determining, based on a history of the locational information of the user terminal, whether a user associated with the user terminal tends to cross a road at a place where no pedestrian crosswalk is provided;

causing identification information of the user to be stored as crossing user information indicating a user crossing a road at a place where no pedestrian crosswalk is provided, when it is determined that the user tends to cross a road at a place where no pedestrian crosswalk is provided; and performing control regarding assistance for a traffic participant on a condition that the identification information of the user is stored as the crossing user information, when the user terminal is at a place where no pedestrian crosswalk is provided, wherein the performing control includes refraining from assistance for a traffic participant, when the identification information of the user is not stored as the crossing user information, if the user terminal is at a place where no pedestrian crosswalk is provided.

18. A non-transitory computer readable storage medium having stored thereon a program that causes a computer to function as:

an obtaining unit that uses the computer to obtain locational information of a user terminal;

a determining unit that uses the computer to determine, based on a history of the locational information of the user terminal, whether a user associated with the user terminal tends to cross a road at a place where no pedestrian crosswalk is provided;

a storage controlling unit that uses the computer to cause identification information of the user to be stored as crossing user information indicating a user crossing a road at a place where no pedestrian crosswalk is provided, when it is determined by the determining unit that the user tends to cross a road at a place where no pedestrian crosswalk is provided; and an assistance controlling unit that uses the computer to perform control regarding assistance for a traffic participant on a condition that the identification information of the user is stored as the crossing user information, when the user terminal is at a place where no pedestrian crosswalk is provided, wherein the assistance controlling unit refrains from assistance for a traffic participant, when the identification information of the user is not stored as the crossing user information, if the user terminal is at a place where no pedestrian crosswalk is provided.

* * * * *